DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 365

T879,004

SPECTRALLY SENSITIZED SILVER HALIDE EMULSION STABILIZED WITH AN AZAINDENE AND SENSITIZED WITH A SULFATED POLYVINYL ALCOHOL

Herbert S. Elins, % Kodak Park Works, Rochester, N.Y. 14650

Filed Feb. 27, 1970, Ser. No. 15,288
**Int. Cl. G03c *1/28***
U.S. Cl. 96—107
No Drawing. 22 Pages Specification

Sulfated polyvinyl alcohols or salts thereof as illustrated in U.S. 3,437,486, when added to a photographic silver halide emulsion which is spectrally sensitized with a cyanine dye increase the sensitivity of the emulsion. When the emulsion also contains an azaindene stabilizer such as 4-hydroxy-6-methyl-1,3,3a,7-tetrazaindene, the sulfated polyvinyl alcohol reduces or eliminates the adverse effect that azaindenes normally have toward sensitizing dyes of deaggregating the J-band dye aggregates. The silver halide of the emulsion can be silver chloride, silver bromide, silver bromoiodide, silver chlorobromoiodide or mixtures thereof and the emulsion can contain other addenda which are often present in photographic emulsions such as hardeners, antifoggants, coating aids, chemical sensitizers, plasticizers and the like. The cyanine dyes with which the advantages are obtained include simple cyanine dyes, carbocyanines and polycarbocyanine dyes and these may have any of the heterocyclic nuclei and the various substituents that are suitable for cyanine sensitizing dyes for silver halides. Examples include 3,3′-diethyl-9-methylthiacarbocyanine bromide, 1,1′-diethyl-2,2′-cyanine iodide, 3,3′-diethyl-4′-methyloxathiazolocarbocyanine iodide and 3,3′-diethylselenadicarbocyanine ethyl sulfate.